(12) United States Patent
Zalmanovitch et al.

(10) Patent No.: US 9,660,889 B2
(45) Date of Patent: *May 23, 2017

(54) TRACKING DATA USAGE UNDER A SCHEMATIZED DATA PLAN

(71) Applicant: Microsoft Technology Licensing, LLC, Redmond, WA (US)

(72) Inventors: Gil Zalmanovitch, Seattle, WA (US); Gregory James Scott, Seattle, WA (US); Shai Guday, Redmond, WA (US); Alec Garvin Kwok, Redmond, WA (US); Yue Jiang, Redmond, WA (US); Kenneth Vincent Ma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,378

(22) Filed: Mar. 9, 2015

(65) Prior Publication Data

US 2015/0181047 A1 Jun. 25, 2015

Related U.S. Application Data (63) Continuation of application No. 13/721,053, filed on Dec. 20, 2012, now Pat. No. 8,977,231.

(Continued)

(51) Int. Cl.
*H04M 11/00* (2006.01)
*H04L 12/26* (2006.01)
(Continued)

(52) U.S. Cl.
CPC ...... *H04L 43/0876* (2013.01); *H04L 12/1435* (2013.01); *H04L 43/04* (2013.01);
(Continued)

(58) Field of Classification Search
CPC ....................................................... H04L 47/14
(Continued)

(56) References Cited

U.S. PATENT DOCUMENTS 6,308,328 B1 10/2001 Bowcutt et al.
7,184,749 B2 2/2007 Marsh et al.
(Continued)

FOREIGN PATENT DOCUMENTS

CN 1317745 A 10/2001
JP 2004072590 A 3/2004
(Continued)

OTHER PUBLICATIONS

"International Search Report", Mailed Date: May 15, 2013, Application No. PCT/US2013/022353, pp. 10.
(Continued)

*Primary Examiner* — David Q Nguyen (57) ABSTRACT

Embodiments provide a schema for representing data usage plans and data usage statistics. The data usage plan describes threshold values associated with network connections of computing devices of the user. A web service dynamically generates data usage statistics for the computing devices to represent data consumed by the computing devices under the data usage plan. The schema is updated with the data usage statistics and distributed to the computing devices for presentation to the user.

20 Claims, 6 Drawing Sheets

Related U.S. Application Data (60) Provisional application No. 61/696,472, filed on Sep. 4, 2012, provisional application No. 61/591,503, filed on Jan. 27, 2012, provisional application No. 61/591,509, filed on Jan. 27, 2012.

(51) Int. Cl.

| | |
|---|---|
| *H04W 4/26* | (2009.01) |
| *H04W 24/02* | (2009.01) |
| *H04M 15/00* | (2006.01) |
| *H04L 12/14* | (2006.01) |
| *H04W 4/24* | (2009.01) |
| *H04W 8/18* | (2009.01) |
| *H04M 1/725* | (2006.01) |
| *H04W 88/06* | (2009.01) |

(52) U.S. Cl.
CPC .......... *H04L 43/062* (2013.01); *H04M 15/41* (2013.01); *H04M 15/58* (2013.01); *H04M 15/60* (2013.01); *H04M 15/765* (2013.01); *H04M 15/80* (2013.01); *H04M 15/83* (2013.01); *H04M 15/84* (2013.01); *H04M 15/846* (2013.01); *H04M 15/85* (2013.01); *H04M 15/86* (2013.01); *H04W 4/24* (2013.01); *H04W 4/26* (2013.01); *H04W 24/02* (2013.01); *H04L 43/045* (2013.01); *H04M 1/72522* (2013.01); *H04M 15/775* (2013.01); *H04M 15/8044* (2013.01); *H04M 15/854* (2013.01); *H04M 15/856* (2013.01); *H04W 8/18* (2013.01); *H04W 88/06* (2013.01)

(58) Field of Classification Search
USPC .............................. 455/405, 406, 416, 414.1
See application file for complete search history.

(56) References Cited

U.S. PATENT DOCUMENTS

| | | | |
|---|---|---|---|
| 7,277,938 B2 | 10/2007 | Duimovich et al. | |
| 7,320,131 B1 | 1/2008 | O'toole, Jr. | |
| 7,406,596 B2 | 7/2008 | Tararukhina et al. | |
| 7,418,532 B2 | 8/2008 | Suzuki et al. | |
| 7,532,571 B1 | 5/2009 | Price et al. | |
| 7,720,727 B2 | 5/2010 | Keyes et al. | |
| 7,904,080 B2 | 3/2011 | Atkins et al. | |
| 7,986,935 B1 | 7/2011 | D'souza et al. | |
| 8,064,876 B2 | 11/2011 | Knight | |
| 8,160,598 B2 | 4/2012 | Savoor | |
| 8,359,389 B1 | 1/2013 | Cohen et al. | |
| 8,484,568 B2 | 7/2013 | Rados et al. | |
| 8,542,661 B2 | 9/2013 | Moeller et al. | |
| 8,689,541 B2* | 4/2014 | McDonald ............ | F02D 41/008 60/284 |
| 2002/0029273 A1 | 3/2002 | Haroldson et al. | |
| 2002/0082991 A1 | 6/2002 | Friedman et al. | |
| 2002/0090926 A1 | 7/2002 | Pirkola et al. | |
| 2003/0066055 A1 | 4/2003 | Spivey | |
| 2003/0115385 A1 | 6/2003 | Adamane et al. | |
| 2003/0181242 A1 | 9/2003 | Lee et al. | |
| 2003/0186706 A1 | 10/2003 | Bergins et al. | |
| 2004/0040021 A1 | 2/2004 | Bharati et al. | |
| 2004/0111712 A1 | 6/2004 | Humpert et al. | |
| 2004/0153587 A1 | 8/2004 | Choi | |
| 2004/0176965 A1 | 9/2004 | Winch et al. | |
| 2004/0199634 A1 | 10/2004 | Jackowski et al. | |
| 2005/0052992 A1 | 3/2005 | Cloonan et al. | |
| 2006/0141983 A1 | 6/2006 | Jagannathan et al. | |
| 2006/0211404 A1 | 9/2006 | Cromp et al. | |
| 2006/0277224 A1 | 12/2006 | Aftab et al. | |
| 2007/0211674 A1 | 9/2007 | Ragnar Karlberg et al. | |
| 2007/0294562 A1 | 12/2007 | Takamatsu et al. | |
| 2008/0318621 A1 | 12/2008 | Fan et al. | |
| 2009/0054030 A1 | 2/2009 | Golds | |
| 2009/0068980 A1 | 3/2009 | Creswell et al. | |
| 2009/0068984 A1 | 3/2009 | Burnett | |
| 2009/0138427 A1 | 5/2009 | Kalavade | |
| 2009/0172275 A1 | 7/2009 | Nochimowski et al. | |
| 2009/0196302 A1 | 8/2009 | Pastorino et al. | |
| 2009/0199196 A1 | 8/2009 | Peracha | |
| 2009/0203352 A1 | 8/2009 | Fordon et al. | |
| 2009/0285201 A1 | 11/2009 | Ben-haim et al. | |
| 2010/0015926 A1 | 1/2010 | Luff | |
| 2010/0017506 A1 | 1/2010 | Fadell | |
| 2010/0035576 A1 | 2/2010 | Jones et al. | |
| 2010/0130163 A1 | 5/2010 | Pousti | |
| 2010/0141009 A1 | 6/2010 | Kirch et al. | |
| 2010/0180190 A1 | 7/2010 | Carroll | |
| 2010/0191612 A1 | 7/2010 | Raleigh | |
| 2010/0318647 A1 | 12/2010 | Savoor et al. | |
| 2011/0019566 A1 | 1/2011 | Leemet et al. | |
| 2011/0047620 A1 | 2/2011 | Mahaffey et al. | |
| 2011/0087985 A1 | 4/2011 | Buchanan et al. | |
| 2011/0137776 A1 | 6/2011 | Goad et al. | |
| 2011/0145920 A1 | 6/2011 | Mahaffey et al. | |
| 2011/0151831 A1 | 6/2011 | Pattabiraman | |
| 2011/0176482 A1 | 7/2011 | Vizor et al. | |
| 2011/0208857 A1 | 8/2011 | Gentile et al. | |
| 2011/0211465 A1 | 9/2011 | Farrugia et al. | |
| 2011/0231551 A1 | 9/2011 | Hassan et al. | |
| 2011/0238826 A1 | 9/2011 | Carre et al. | |
| 2011/0244826 A1 | 10/2011 | Krishnan et al. | |
| 2011/0275344 A1 | 11/2011 | Momtahan et al. | |
| 2011/0276442 A1 | 11/2011 | Momtahan et al. | |
| 2011/0300865 A1 | 12/2011 | Kashikar et al. | |
| 2012/0054661 A1 | 3/2012 | Rados et al. | |
| 2012/0101952 A1 | 4/2012 | Raleigh et al. | |
| 2012/0108200 A1* | 5/2012 | Rubin ................... | H04L 47/14 455/405 |
| 2012/0142310 A1 | 6/2012 | Pugh et al. | |
| 2012/0155296 A1 | 6/2012 | Kashanian | |
| 2012/0158947 A1 | 6/2012 | Hassan et al. | |
| 2012/0163232 A1 | 6/2012 | Yoo | |
| 2012/0198046 A1 | 8/2012 | Shah et al. | |
| 2012/0208495 A1 | 8/2012 | Lawson et al. | |
| 2012/0278194 A1 | 11/2012 | Dewan et al. | |
| 2012/0290584 A1 | 11/2012 | De Bona et al. | |
| 2012/0315872 A1 | 12/2012 | Amato et al. | |
| 2013/0023230 A9 | 1/2013 | Momtahan et al. | |
| 2013/0035059 A1 | 2/2013 | Liu et al. | |
| 2013/0054378 A1 | 2/2013 | Hao et al. | |
| 2013/0060653 A1 | 3/2013 | Sharkey | |
| 2013/0117846 A1 | 5/2013 | Mahaffey et al. | |
| 2013/0122882 A1 | 5/2013 | Patel et al. | |
| 2013/0149994 A1 | 6/2013 | Gaddam et al. | |
| 2014/0301218 A1 | 10/2014 | Luo et al. | |

FOREIGN PATENT DOCUMENTS

| | | |
|---|---|---|
| JP | 2010103892 A | 5/2010 |
| WO | 2008/097105 A1 | 8/2008 |
| WO | 2008155444 A1 | 12/2008 |
| WO | 2012083285 A2 | 6/2012 |
| WO | 2012/162419 A2 | 11/2012 |

OTHER PUBLICATIONS

"International Search Report & Written Opinion for PCT Patent Application No. PCT/US2013/022822", Mailed Date: Apr. 25, 2013, Filed Date: Jan. 24, 2013, 9 Pages.

Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.

Balasubramanian, Aruna, "Architecting Protocols to Enable Mobile Applications in Diverse Wireless Networks", A Dissertations and Theses, University of Massachusetts, Amherst, Feb. 2011, 198 Pages.

(56) References Cited

OTHER PUBLICATIONS

Peddemors, Arjan, "Network Resource Awareness and Prediction on Mobile Devices", In Novay PhD Research Series, No. 026 (Novay/PRS/026), Oct. 2009, 236 Pages.
"Rapid Mobile Data Service Creation and Monetization", Published on: Oct. 2, 2012, Available at: http://www.amdocs.com/Products/network-control/Documents/data-experience-solution-datasheet.pdf, 7 Pages.
Unuth, Nadeem, "Data Usage Monitor Apps for Your iPhone and iPad", Available at: http://web.archive.org/web/20120616072521/http://voip.about.com/od/voipbandwidth/tp/Data-Usage-Monitor-Apps-For-Your-Iphone-And-Ipad.htm, posted on Jun. 16, 2012, 1 Page.
"Non-Final Office Action Received for U.S. Appl. No. 13/721,041", Mailed Date: Mar. 28, 2014, Filed Date: Dec. 20, 2012, 14 Pages.
"Non-Final Office Action Received for U.S. Appl. No. 13/721,069", Mailed Date: Mar. 14, 2014, Filed Date: Dec. 20, 2012, 14 Pages.
"Non-Final Office Action Received for U.S. Appl. No. 13/721,029", Mailed Date: Mar. 11, 2014, Filed Date: Dec. 20, 2012, 13 Pages.
"Non-Final Office Action Received for U.S. Appl. No. 13/721,023", Mailed Date: Mar. 28, 2014, Filed Date: Dec. 20, 2012, 15 Pages.
"Non-Final Office Action Received for U.S. Appl. No. 13/721,032", Mailed Date: Feb. 6, 2014, Filed Date: Dec. 20, 2012, 10 Pages.
"Non-Final Office Action Received for U.S. Appl. No. 13/721,058", Mailed Date: Apr. 16, 2014, Filed Date: Dec. 20, 2012, 10 Pages.
"Non-Final Office Action for U.S. Appl. No. 13/721,032", Mailed Date: Aug. 5, 2014, Filed Date: Dec. 20, 2012, 16 Pages.
"Supplementary Search Report Issued in European Patent Application No. 13741633.5", Mailed Date: Sep. 18, 2014, 3 Pages.
Heikkinen, et al., "Measuring Mobile Peer-to-Peer Usage: Case Finland 2007", Retrieved at <<http://pam2009.kaist.ac.kr/paper/54480165.pdf>>, Proceedings of the Passive and Active Measurement conference, Seoul, South Korea Apr. 1-3rd, 2009, Apr. 1, 2009, pp. 165-174.
Sinofsky, Steven, "Engineering Windows 8 for mobile networks", Retrieved at <<http://blogs.msdn.com/b/b8/archive/2012/01/20/engineering-windows-8-for-mobility.aspx>>, Jan. 20, 2012, pp. 28.
Blass, Evan, "Exclusive: Windows Phone 8 Detailed", Retrieved at <<http://pocketnow.come/windows-phone/exclusive-windows-phone-8-detailed>>, Feb. 3, 2012, pp. 2.
"Examination Report Issued in European Patent Application No. 13741633.5", Mailed Date: Nov. 27, 2014, 5 Pages.
"Non-Final Office Action Received for U.S. Appl. No. 13/721,041", Mailed Date: Jan. 7, 2015, Filed Date: Dec. 20, 2012, 33 Pages.
"Final Office Action Received for U.S. Appl. No. 13/721,069", Mailed Date: Nov. 28, 2014, Filed Date: Dec. 20, 2012, 36 Pages.
"Non-Final Office Action Received for U.S. Appl. No. 13/721,029", Mailed Date: Oct. 1, 2014, Filed Date: Dec. 20, 2012, 32 Pages.
"Non-Final Office Action Received for U.S. Appl. No. 13/721,029", Mailed Date: Mar. 17, 2015, Filed Date: Dec. 20, 2012, 56 Pages.
"Final Office Action Received for U.S. Appl. No. 13/721,023", Mailed Date: Oct. 27, 2014, Filed Date: Dec. 20, 2012, 15 Pages.
"Non-Final Office Action Received for U.S. Appl. No. 13/721,023", Mailed Date: Feb. 13, 2015, Filed Date: Dec. 20, 2012, 18 Pages.
"Notice of Allowance for U.S. Appl. No. 13/721,032", Mailed Date: Jan. 30, 2015, Filed Date: Dec. 20, 2012, 11 Pages.
"Final Office Action Received for U.S. Appl. No. 13/721,058", Mailed Date: Sep. 22, 2014, Filed Date: Dec. 20, 2012, 14 Pages.
"Non-Final Office Action Received for U.S. Appl. No. 13/721,058", Mailed Date: Jan. 22, 2015, Filed Date: Dec. 20, 2012, 12 Pages.
"DataMan Pro for iPad—Analyze your 3G Data Usage on Your Computer", Retrieved from <<http://prmac.com/release-id-27794.htm>>, Jul. 9, 2011, 2 Pages.
"Mobile Data Usage Meter—Manage Mobile Data Usage & Wireless Broadband Devices", Retrieved from <<http://web.archive.org/web/20091228092436/http://www.telstrabusiness.com/business/portal/online/site/myaccount/mobiledatausagemeter.94003>>, Jan. 28, 2015, 2 Pages.
"My Data Usage Pro", Retrieved from <<http://download.cnet.com/My-Data-Usage-Pro/3000-2094_4-75402502.html>>, Retrieved Date: Dec. 12, 2014, 3 Pages.
"Final Office Action Issued in U.S. Appl. No. 13/721,023", Mailed Date: Oct. 5, 2015, 26 Pages.
"Final Office Action Issued in U.S. Appl. No. 13/721,041", Mailed Date: Sep. 14, 2015, 24 Pages.
"Applicant-Initiated Interview Summary Issued in U.S. Appl. No. 13/721,053", Mailed Date: May 30, 2014, 3 pages.
"Examiner-Initiated Interview Summary Issued in U.S. Appl. No. 13/721,053", Mailed Date: Aug. 19, 2014, 2 pages.
"Non-Final Office Action Issued in U.S. Appl. No. 13/721,053", Mailed Date: Mar. 18, 2014, 8 pages.
"Non-Final Office Action Issued in U.S. Appl. No. 13/721,066", Mailed Date: Feb. 13, 2015, 17 Pages.
"Non-Final Office Action Issued in U.S. Appl. No. 13/721,069", Mailed Date: Jul. 7, 2015, 27 Pages.
"Notice of Allowance Issued in U.S. Appl. No. 13/721,069", Mailed Date: Feb. 17, 2016, 12 Pages.
"Office Action Issued in European Patent Application No. 13741434.8", Mailed Date: Nov. 27, 2014, 6 Pages.
"Supplementary Search Report Issued in European Patent Application No. 13741434.8", Mailed Date: Sep. 30, 2014, 3 Pages.
"First Office Action and Search Report Issued in Chinese Patent Application No. 201380006806.5", Mailed Date: Dec. 1, 2015, 13 Pages.
"Second Office Action Issued in Chinese Patent Application No. 201380006806.5", Mailed Date: Aug. 12, 2016, 6 Pages.
Rhee, Ed, "How to Track Data Usage on your Android Phone", Retrieved from <<http://www.cnet.com/how-to/how-to-track-data-usage-on-your-android-phone/>>, Jul. 8, 2011, 4 Pages.
"Non-Final Office Action Issued in U.S. Appl. No. 14/839,243", Mailed Date: Jun. 16, 2016, 16 Pages.
"Non-Final Office Action Issued in U.S. Appl. No. 13/721,023", Mailed Date: Jun. 16, 2016, 23 Pages.
"Non-Final Office Action Issued in U.S. Appl. No. 13/721,041", Mailed Date: Apr. 8, 2016, 24 Pages.
"Non-Final Office Action Issued in U.S. Appl. No. 13/721,029", Mailed Date: Feb. 18, 2016, 33 Pages.
"Office Action Issued in Russian Patent Application No. 2014131055", Mailed Date: Aug. 18, 2016, 5 Pages. (w/o English Translation).
"Office Action Issued in Japanese Patent Application No. 2014-554756", Mailed Date: Nov. 22, 2016, 3 Pages. (w/o English Translation).

* cited by examiner

TRACKING DATA USAGE UNDER A SCHEMATIZED DATA PLAN

CROSS-REFERENCE TO RELATED APPLICATIONS

This application is a continuation of U.S. application Ser. No. 13/721,053, filed Dec. 20, 2012, which claims the benefit of U.S. Provisional Application No. 61/696,472, filed Sep. 4, 2012, U.S. Provisional Application No. 61/591,503, filed Jan. 27, 2012, and U.S. Provisional Application No. 61/591,509, filed Jan. 27, 2012. The entireties of these four applications are hereby incorporated by reference herein.

This application is related to the following applications: U.S. Patent Application entitled "Managing Data Transfers Over Network Connections Based on Priority and a Data Usage Plan," U.S. Patent Application entitled "On-Device Attribution of Network Data Usage," U.S. Patent Application entitled "Predicting Network Data Consumption Relative to Data Usage Patterns," U.S. Patent Application entitled "Updating Dynamic Data Usage Plans and Statistics," U.S. Patent Application entitled "Data Usage Profiles for Users and Applications," U.S. Patent Application entitled "Recommendations for Reducing Data Consumption Based on Data Usage Profiles," U.S. Patent Application entitled "Dynamically Adjusting a Data Usage Plan Based on Data Usage Statistics," and U.S. Patent Application entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering unlimited mobile data plans to offering capped and metered plans. With some of the capped and metered plans, the fees for exceeding the allotted data caps may be significant. While some existing web browsers attempt to optimize data traffic, the existing systems generally lack mechanisms for balancing specific needs of each user with data transfer costs. Further, some of the existing systems are unable to accurately track and attribute the amount of data consumed under the plans.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can impact the user experience, leading to dissatisfied customers, increased customer service calls, and negative impressions of the mobile operators.

SUMMARY

Embodiments of the disclosure generate and represent data usage statistics with a schema. The schema represents a data usage plan associated with at least one user. The data usage plan describes threshold values associated with network connections of a plurality of computing devices of the user. The web service collects data from a mobile operator and/or the plurality of computing devices of the user. The data usage statistics are generated from the collected data, and represent data consumed under the data usage plan. The schema is updated with the generated data usage statistics and distributed to the plurality of computing devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable the collection into a schema 116 of data relating to network transfers by a plurality of computing devices. In some embodiments, a centralized service such as a web service 108 monitors data consumption by one or more of the computing devices under a data usage plan. For example, the web service 108 may receive data usage statistics 120 from the computing devices and/or from one or more mobile operators 111 associated with the data usage plan. The web service 108 presents the data usage statistics 120 to a user 104 relative to threshold values 118 associated with the data usage plan to provide the user 104 with an indication of the data usage and trending. In other embodiments, the computing devices, such as a mobile computing device 102, generate the data usage statistics 120 for presentation to the user 104.

Aspects of the disclosure employ the schema 116 such as an extensible markup language (XML) schema to represent the data usage plan and, in some embodiments, to represent the data usage statistics 120. The schema 116 enables descriptions of the parts, components, services, features, or other aspects of the data usage plan including, but not limited to, multi-rate data plans, peak times, roaming rates, allotted data consumption per network connection 130, etc. In some embodiments, the schema 116 allows the mobile operators 111 to send out updated portions of the schema 116 corresponding to updated parts of the data usage plan.

Figure 1:
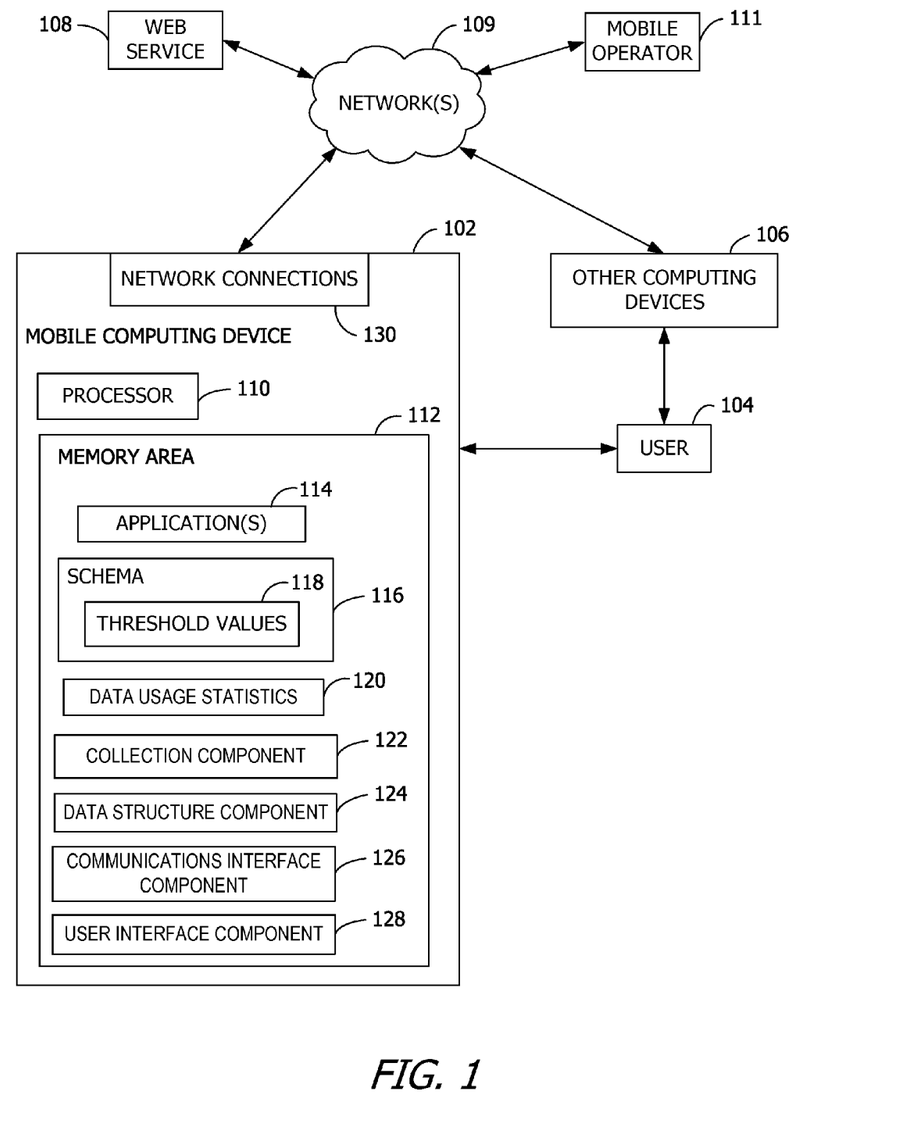
FIG. 1 is an exemplary block diagram illustrating user computing devices communicating over one or more networks.

Referring to FIG. 1, an exemplary block diagram illustrates user computing devices communicating over one or more networks 109. In some embodiments, one or more of the user computing devices are associated with a data usage plan. For example, a plurality of the user computing devices may share data allotted under the same or common data usage plan.

The user computing devices include any device executing instructions (e.g., as application programs, operating system functionality, or both) to implement operations and functionality. The user computing devices may include, for example, the mobile computing device 102 or any other portable device. In some embodiments, the mobile computing device 102 includes a mobile telephone, laptop, tablet, computing pad, netbook, gaming device, e-reader, and/or portable media player. Other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication between the mobile computing device 102 and other devices may occur using any protocol or mechanism over one or more of the networks 109. The networks 109 represent any infrastructure or other means for sending and/or receiving data. The networks 109 may include wired and/or wireless networks.

The user computing devices communicate with the web service 108, or other entity that tracks network data consumption by the user computing devices. Further, one or more of the mobile operators 111 communicate with the web service 108 and/or the user computing devices.

In some embodiments, the mobile computing device 102 has at least one processor 110 and a memory area 112. The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures (e.g., FIG. 3).

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102. The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

The memory area 112 further stores at least one schema 116. The schema 116 represents a data usage plan associated with the user 104, and may be populated with the data usage statistics 120. For example, the user 104 has contracted with the mobile operator 111 to receive network transfer services from the mobile operator 111. The data usage plan describes the services provided by the mobile operator 111, such as the amount of network data the user 104 can consume during a particular duration (e.g., a billing time period). For example, the data usage plan describes threshold values 118 associated with network connections 130 of one or more devices of the user 104. The network connections 130 represent communication channels or other means for sending and/or receiving data over the network 109. Exemplary network connections 130 include, but are not limited to, Wi-Fi, cellular, tethered, BLUETOOTH brand communication, near-field communication (NFC), and more. The network connections 130 may also be categorized into voice, text, data, or other categories or types of network traffic. The threshold values 118 represent the maximum amount of data consumption allotted for the network connections 130. For example, one threshold value 118 may indicate the maximum amount of data consumption for a Wi-Fi connection, while another threshold value 118 indicates a maximum amount of data consumption for a cellular data connection.

Aspects of the disclosure are operable with any quantity of populated schemas 116. Each of the populated schemas 116 is associated with a different data usage plan, For example, the mobile computing device 102 may have more than one cellular connection, and each of the cellular connections work independently (e.g., multiple radios operating independently of each other). In such embodiments, there may be multiple data usage plans active per cellular connection. Exemplary environments include dual subscriber identity module (SIM) dual active devices (both connections independently active) or dual SIM dual standby devices (one connection is in a standby mode). Additional examples include virtual SIMs, universal integrated circuit cards (UICCs), and other variants of user identity modules.

In some embodiments, the schema 116 includes a plurality of fields. Each of the threshold values 118 may be associated with one or more of the fields. For example, the fields may correspond to one or more of the following: peak times, off-peak times, peak time data consumption quota, off-peak time data consumption quota, peak time data consumption remaining, off-peak time data consumption remaining, a roaming rate and rules, a mobile operator name, a billing cycle type, a network connection type, identification of free or reduced-cost hosts available for connection, a list of mobile hotspots, and any other elements or information pertaining to the data usage plan. The set of free or reduced-cost hosts represents zero-rated or other reduced cost hosts (e.g., visiting particular web sites does not count against the data usage plan) or data types (e.g., multimedia messaging service data). In some embodiments, the zero-rated or reduced-cost hosts or data may be identified in a form of a blacklist.

The schema 116 may also include fields supporting different billing rates per host accessed, and allow each mobile operator 111 the flexibility to define complex plans including broadly offered plans, and dynamic, short-term offers to specific users 104 likely to use a specific part or parts of the overall services. Other offers based on any combination of the metrics obtained are available to the mobile operator 111.

The schema 116 may also include fields corresponding to the data usage statistics 120 collected or generated by the mobile computing device 102, the web service 108, and/or the mobile operator 111.

While the schema 116 may take any form or structure, the schema 116 may be implemented as XML schema. Appendix A includes an exemplary XML schema for use in aspects of the disclosure.

The data usage statistics 120 identify, to a granularity of time (e.g., per minute) or data (e.g., per kilobyte), how much data has been sent and/or received by the mobile computing device 102 or the other computing devices 106, and over which network connections 130. Other data usage statistics 120 are contemplated, however. The data usage statistics 120 may be generated by the mobile computing device 102, by the web service 108, and/or by the mobile operator 111. For example, the mobile computing device 102 may collect the data usage statistics 120 representing network data consumed by the mobile computing device 102, and then update the data usage statistics 120 with information received from the web service 108 representing network data consumed by the other computing devices 106 of the user 104 (e.g., associated with the same data usage plan).

In some embodiments, if the web service 108 detects that the mobile computing device 102 has old or outdated data usage statistics 120, the web service 108 may send a notification to the mobile computing device 102 to synchronize the data usage statistics 120 directly with the mobile operator 111 or with the web service 108.

The memory area 112 further stores one or more computer-executable components. Exemplary components include a collection component 122, a data structure component 124, a communications interface component 126, and a user interface component 128. Operation of the components, when executed, is described below with reference to FIG. 3.

In some embodiments, the communications interface component 126 includes a network interface card and/or computer-executable instructions (e.g., a driver) for operating the network interface card. In some embodiments, the communications interface is operable with near-field communication (NFC) tags.

The user interface component 128 may include a graphics card for displaying data to the user 104 and receiving data from the user 104. The user interface component 128 may also include computer-executable instructions (e.g., a driver) for operating the graphics card. Further, the user interface component 128 may include a display (e.g., a touch screen display or natural user interface) and/or computer-executable instructions (e.g., a driver) for operating the display. The user interface component 128 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the computing device in a particular way.

Figure 2:
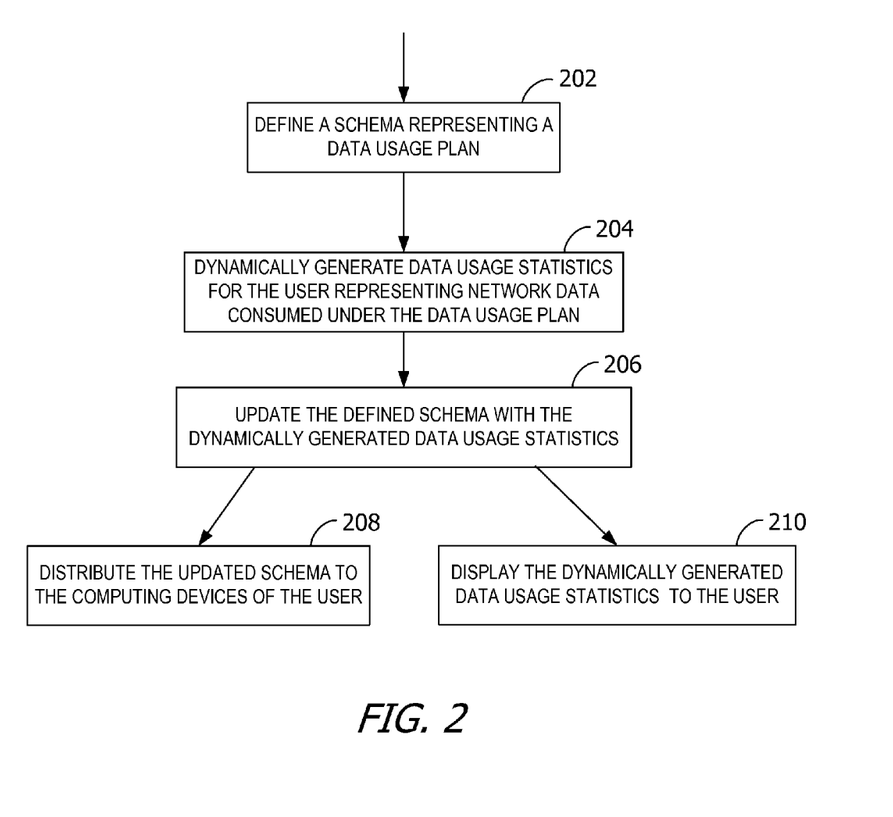
FIG. 2 is an exemplary flow chart illustrating operation of a web service to track network data consumed by a plurality of user computing devices under a data usage plan.

Referring next to FIG. 2, an exemplary flow chart illustrates operation of the web service 108 to track network data consumed by the user computing devices under the data usage plan. At 202, the web service 108 defines the schema 116 representing the data usage plan. Defining the schema 116 includes, for example, defining the schema 116 for use by the mobile operator 111. Alternatively or in addition, defining the schema 116 includes receiving the schema 116 from the mobile operator 111. The schema 116 represents the data usage plan associated with one or more of the users 104.

At 204, the web service 108 dynamically generates the data usage statistics 120 for the user 104. The data usage statistics 120 represent data consumed under the data usage plan by one or more of the computing devices associated with the user 104. The data usage statistics 120 may be viewed as a current or instant snapshot of the amount of data transmitted and/or received by the computing devices of the user 104 that share the data usage plan. The web service 108 may collect information relating to text messages, voice calls, minutes used, voice over Internet Protocol (VoIP) usage, and any other element of usage consumed by, or that impacts, the user computing devices to produce the data usage statistics 120.

Dynamically generating the data usage statistics 120 may include receiving data from the user computing devices and/or from the mobile operator 111. The data corresponds to at least a portion of the data usage statistics 120 and may be received in a format that conforms to the schema 116. For example, the mobile operator 111 may have more current and/or more accurate data usage statistics 120 for one or more of the user computing devices than the user computing devices. As another example, the mobile operator 111 may have more current and/or more accurate data usage statistics 120 for some of the network connections 130 than the user computing devices. The mobile operator 111 may push, or transmit upon demand, such data usage statistics 120 to the web service 108. The web service 108 integrates the data from the mobile operator 111 and/or the user computing devices to produce the data usage statistics 120.

The web service 108 may further generate the data usage statistics 120 by comparing data collected from the mobile operators 111 to data collected from the user computing devices. For example, the web service 108 may receive first data corresponding to at least a portion of the data usage statistics 120 from the mobile operator 111, and receive second data corresponding to at least a portion of the data usage statistics 120 from one or more of the user computing devices. If differences exist (e.g., the data from the mobile operator 111 may be 24-48 hours old), the web service 108 reconciles the differences to provide the user 104 with the most current information. Continuing the example from above, the web service 108 may reconcile the received first data and the received second data to produce the dynamically generated data usage statistics.

Reconciling the differences in data received from the mobile operators 111 and/or the user computing devices includes, for example, examining time stamps or other collection dates and favoring, weighting, or choosing the more recently collected data. Continuing the above example, reconciling the received first data and the received second data includes, for example, comparing a timestamp associated with the received first data and a timestamp associated with the received second data. The web service 108 may integrate the data having the later, or more recent, timestamp into the data usage statistics 120.

At 206, the web service 108 updates the defined schema 116 with the dynamically generated data usage statistics 120. For example, the web service 108 populates a data structure conforming to the defined schema 116 with the data usage statistics 120. At 208, the web service 108 distributes the updated schema 116 to the plurality of computing devices of the user 104 that share the same data usage plan. The plurality of computing devices may then update any locally stored copies of the data usage statistics 120 to reflect the current or up-to-date network data consumed under the data usage plan.

At 210, the web service 108 may display the data usage statistics 120 to the user 104. For example, the data usage statistics 120 may be displayed to the user 104 in various user interfaces (e.g., see FIG. 4, FIG. 5A, FIG. 5B, FIG. 5C, and FIG. 6).

While FIG. 2 illustrates the example scenario of the web service 108 collecting the data usage statistics 120, updating the schema 116, and distributing the schema 116 to the user computing devices, similar operations may be performed by the user computing devices, as next described with reference to FIG. 3.

Figure 3:
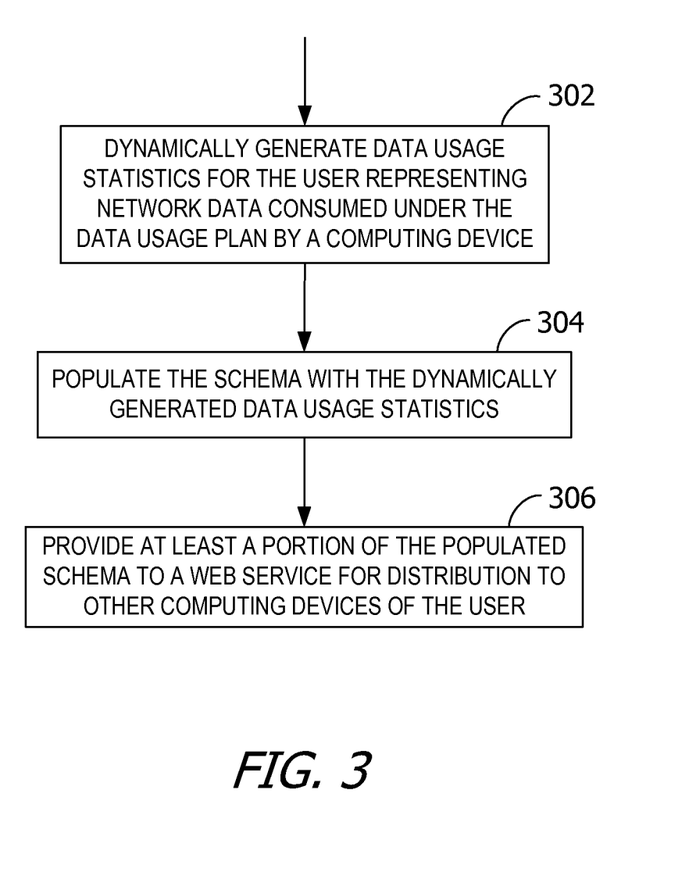
FIG. 3 is an exemplary flow chart illustrating operation of a computing device to populate a schema with statistics about the network data consumed by the computing device under a data usage plan.

Referring next to FIG. 3, an exemplary flow chart illustrates operation of a computing device to populate the schema 116 with statistics about the network data consumed by the computing device under the data usage plan. While next described with reference to the mobile computing device 102 executing the operations illustrated in FIG. 3, the operations may also be executed by the other computing devices 106 of the user 104.

At 302, the mobile computing device 102 dynamically generates the data usage statistics 120 for the user 104. For example, the mobile computing device 102 collects ongoing usage data relating to network data transfers, such as from device radios, drivers, and accelerometers. The collected usage data includes, for example, the amount of data consumed, the time and date of usage, the location of usage, network interface used, the SIM card or other user identity module used for dual SIM scenarios, the international mobile station equipment identity (IMEI) or other device identifier for multi-device scenarios, the IP or other address of the access point used for Wi-Fi scenarios, the IP or other address of the target computer (e.g., for whitelist/blacklists in data usage), and the application responsible for the data transfer.

At 304, the mobile computing device 102 populates the schema 116 (e.g., stored in the memory area 112) with the dynamically generated data usage statistics 120. At 306, the mobile computing device 102 provides at least a portion of the populated schema 116 to the web service 108 for distribution to the other computing devices 106 of the user 104. Alternatively or in addition, the mobile computing device 102 may distribute the populated schema 116, or a portion thereof, to the other computing devices 106 of the user 104. The mobile computing device 102 may also present the dynamically generated data usage statistics 120 to the user 104 in a user interface of the mobile computing device 102.

The mobile computing device 102 may also send and receive portions of the schema 116 representing the data usage plan. For example, the mobile computing device 102 may upload only a portion of the populated schema 116 to the web service 108 at a particular time or during a particular time interval. As another example, the mobile computing device 102 may download only a portion of the schema 116 from the web service 108 at a particular time or during a particular time interval.

In some embodiments, the mobile computing device 102 executes the computer-executable components illustrated in FIG. 1 to implement one or more of the operations illustrated in FIG. 3. For example, the collection component 122, when executed by the processor 110, causes the processor 110 to dynamically generate the data usage statistics 120. The data structure component 124, when executed by the processor 110, causes the processor 110 to populate the schema 116 with the data usage statistics 120 dynamically generated by the collection component 122. The communications interface component 126, when executed by the processor 110, causes the processor 110 to transmit the schema 116 populated by the data structure component 124 to the web service 108 for distribution to the other computing devices 106 of the user 104. The communications interface component 126 may also receive the schema 116 populated with details of the data usage plan from the web service 108 and/or from the mobile operator 111. The communications interface component 126 may also receive updated versions of the schema 116, or portions thereof.

The user interface component 128, when executed by the processor 110, causes the processor 110 to display the data usage statistics 120 dynamically generated by the collection component 122 to the user 104. For example, the user interface component 128 may display data usage and a trending analysis.

Figure 4:
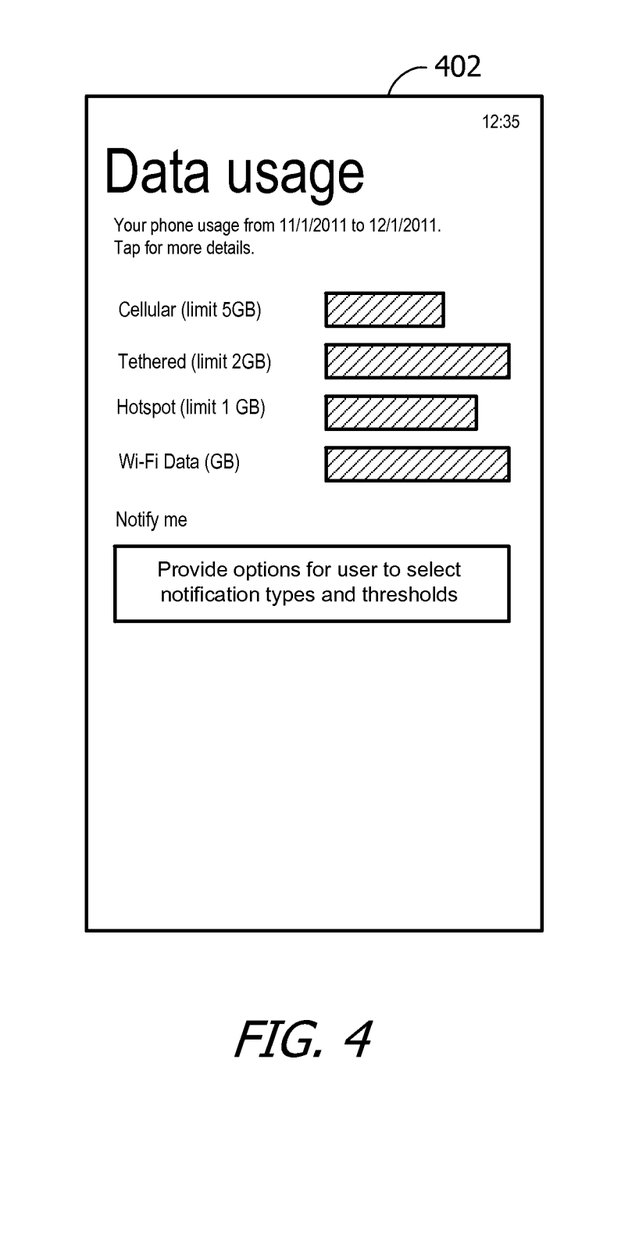
FIG. 4 is an exemplary user interface illustrating a summary of network data usage with different types of network connections.

Referring next to FIG. 4, an exemplary user interface 402 illustrates a summary of network data usage with different types of network connections 130. While the proportions of the user interfaces 402, 502, 504, 506 illustrated in FIG. 4, FIG. 5A, FIG. 5B, FIG. 5C, and FIG. 6 are shown to conform to a screen of the mobile computing device 102 (e.g., a mobile telephone), the content displayed within the user interfaces 402, 502, 504, 506 may be shown in any format on any of the user computing devices.

In FIG. 4, data usage for a plurality of the network connections 130 is shown to the user 104 in the user interface 402. In particular, data usage statistics 120 attributed to each of the network connections 130 is shown. For example, the amounts of data transmitted and/or received over a cellular network connection, a tethered network connection, a Hotspot network connection, and a Wi-Fi network connection are shown. The amounts of data are represented by proportionally-sized horizontal bars.

The user interface 402 also displays the threshold values 118 associated with each of the network connections 130. The threshold values 118 are taken from the data usage plan. For example, the data usage plan indicates that the user 104 has a maximum of 5 gigabytes (GB) of data usage available for the cellular network connection, 2 GB of data usage for the tethered network connection, 1 GB of data usage for the Hotspot network connection, and an unlimited amount of data usage for the Wi-Fi network connection.

The user interface 402 in FIG. 4 may also display a button or bar that, when selected by the user 104 (e.g., clicked or touched), the user interface 402 allows the user 104 to select options or other configuration settings for receiving notifications. The notifications are sent when the amounts of data transmitted and/or received over the various network connections 130 reaches particular values (e.g., set by the user 104, mobile computing device 102, mobile operator 111, or other entity).

Figure 5A:
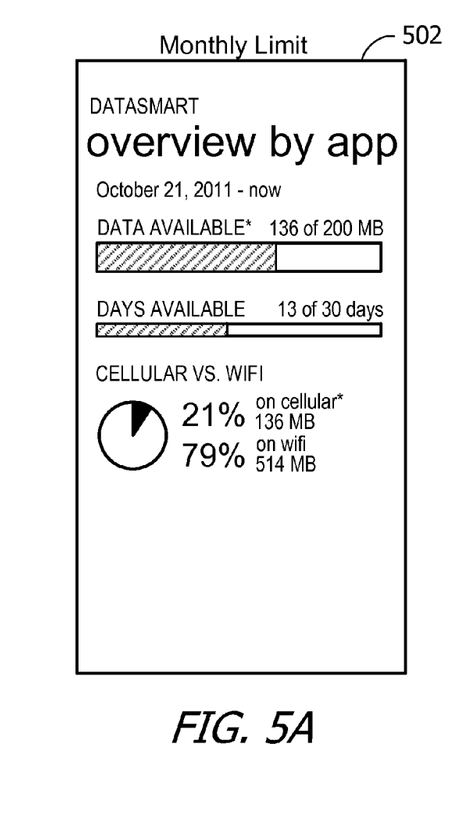
FIG. 5A is an exemplary user interface illustrating data usage by a mobile computing device consuming network data under a data usage plan with a monthly limit.

Referring next to FIG. 5A, an exemplary user interface 502 illustrates data usage by the mobile computing device 102 consuming network data under the data usage plan having a monthly limit. While the overviews of data usage illustrated in FIG. 5A, FIG. 5B, and FIG. 5C indicate that the data usage statistics 120 shown are per application, the user interfaces 502, 504, 506 may alternatively or in addition display an overview of aggregated data usage across the applications 114 on the mobile computing device 102. Further, the user interfaces 502, 504, 506 may alternatively or in addition display an overview of data usage per computing device of the user 104 or aggregated across a plurality of the computing devices of the user 104. For example, the different statistics may be shown in different tabs or tiles in the user interface. In an example involving a family or shared data plan, the statistics for each plan member may be shown in separate tiles.

In FIG. 5A, the data usage statistics 120 include the amount of network data consumption remaining for use (e.g., the remainder of the monthly limit specified by the data usage plan), the amount of network data consumption used during the current billing period, and the quantity of time (e.g., days) remaining within the current billing period. The data usage statistics 120 also indicate a breakout of the data usage, such as the amount of data consumed under a cellular network connection versus the amount of data consumed under a Wi-Fi network connection.

Figure 5B:
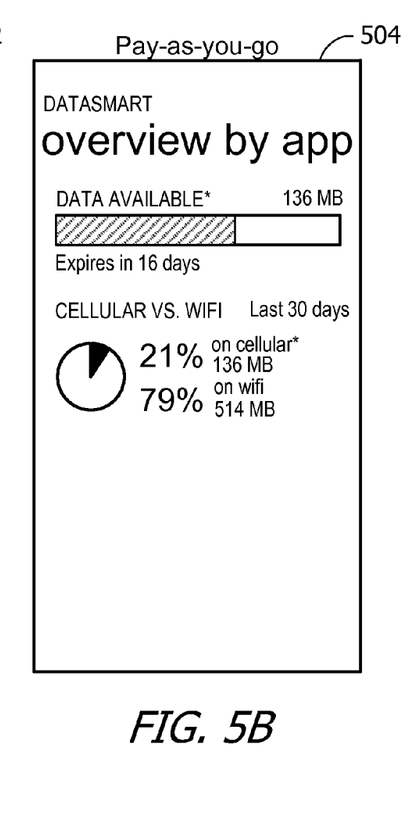
FIG. 5B is an exemplary user interface illustrating data usage by a mobile computing device consuming network data under a pay-as-you-go data usage plan.

Referring next to FIG. 5B, an exemplary user interface 504 illustrates data usage by the mobile computing device 102 consuming network data under a pay-as-you-go data usage plan. In FIG. 5B, the data usage statistics 120 include the amount of network data consumption remaining for use (e.g., the remainder of the pay-as-you-go amount specified by the data usage plan), the amount of network data consumed recently (e.g., within the last 30 days), and the quantity of time (e.g., days) remaining. For example, the remaining bandwidth (e.g., data consumption) expires in 16 days. The data usage statistics 120 also indicate a breakout of the data usage, such as the amount of data consumed under a cellular network connection versus the amount of data consumed under a Wi-Fi network connection.

Figure 5C:
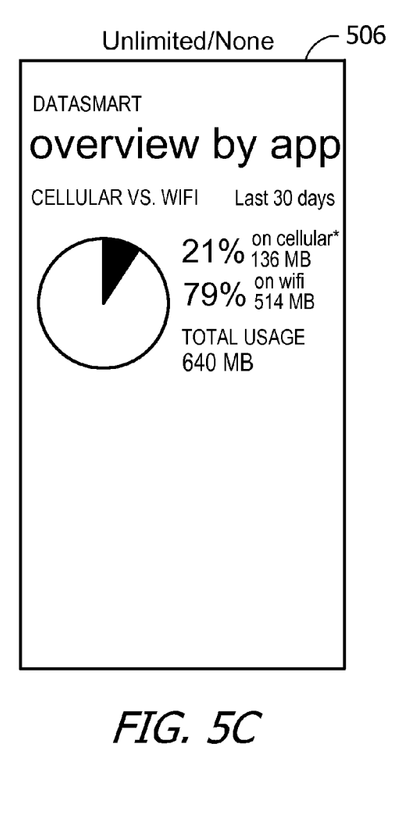
FIG. 5C is an exemplary user interface illustrating data usage by a mobile computing device consuming network data under a data usage plan with unlimited data usage.

Referring next to FIG. 5C, an exemplary user interface 506 illustrates data usage by the mobile computing device 102 consuming network data under the data usage plan with unlimited data usage. In FIG. 5C, the data usage statistics 120 include the amount of network data consumed recently (e.g., within the last 30 days). The data usage statistics 120 also indicate a breakout of the data usage, such as the amount of data consumed under a cellular network connection versus the amount of data consumed under a Wi-Fi network connection. The data usage statistics 120 also indicate a total amount of usage by the mobile computing device 102.

Figure 6:
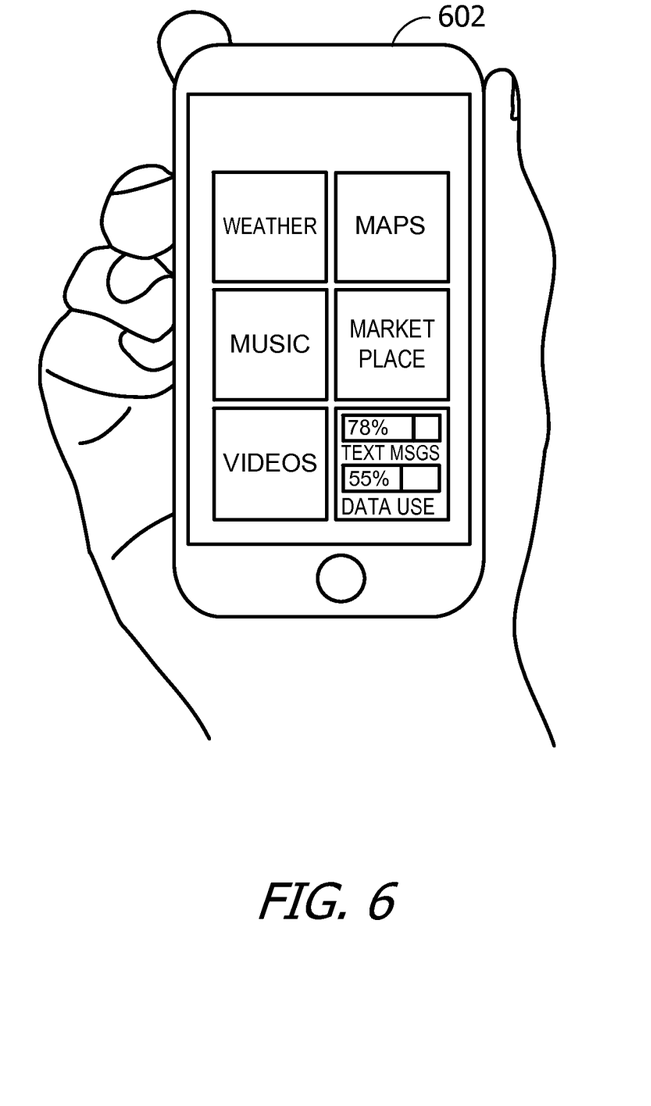
FIG. 6 is an exemplary block diagram illustrates a mobile computing device having a tile for displaying network data usage statistics to a user.

Referring next to FIG. 6, an exemplary block diagram illustrates the mobile computing device 102 as a mobile telephone 602 having a tile for displaying the data usage statistics 120 to the user 104. The mobile telephone 602 displays a plurality of tiles (e.g., active tiles) that may be updated with the data usage statistics 120. In some embodiments, tiles represent tile user interface elements. In the example of FIG. 6, the mobile telephone 602 indicates that 78% of the allotment for text messages has been consumed, while 55% of the allotment for data usage has been consumed.

Further, any of the tiles displaying the data usage statistics 120 may be pinned to a home screen of the mobile telephone 602 to enable the user 104 to instantly view whether data is being consumed, how much data has been consumed, how the data is being consumed, and how much data remains available under the data usage plan.

Additional Examples

In an example scenario, the user 104 has a 750 megabyte (MB) monthly data usage plan for the mobile computing device 102. The user 104 views the data usage plan in the user interface of the mobile computing device 102, and is able to immediately view the threshold values 118, the amount of data currently consumed under the data usage plan, and how much data consumption is remaining and over which of the network connections 130 (e.g., voice, text, data, etc.).

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for defining the schema 116 to describe individual portions of the data usage plan.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below are exemplary schema portions that are operable in aspects of the disclosure. While written in extensible markup language (XML) format, the schema may be implemented in other formats.

```xml
<?xml version="1.0" encoding="UTF-8"?>
<xs:schema xmlns:xs="Base/v1"
elementFormDefault="qualified"
targetNamespace="CarrierControl/Base/v1">
    <!-- Basic types -->
    <xs:simpleType name="NameType">
        <xs:restriction base="xs:normalizedString">
            <xs:minLength value="1"/>
            <xs:maxLength value="255"/>
            <xs:whiteSpace value="collapse"/>
        </xs:restriction> </xs:simpleType>
    <xs:simpleType name="Priority">
        <xs:restriction base="xs:nonNegativeInteger">
            <xs:maxExclusive value="10"/>
        </xs:restriction>
    </xs:simpleType>
    <xs:simpleType name="GUID">
        <xs:annotation>
            <xs:documentation xml:lang="en"> The representation of a GUID,
generally the id of an element. </xs:documentation>
        </xs:annotation>
        <xs:restriction base="xs:token">
            <xs:pattern value="\{[a-fA-F0-9]{8}-[a-fA-F0-9]{4}-[a-fA-F0-9]{4}-[a-fA-F0-9]{4}-[a-fA-F0-9]{12}\}"/>
        </xs:restriction>
    </xs:simpleType>
    <xs:simpleType name="SubscriberType">
        <xs:restriction base="xs:token">
            <xs:maxLength value="20"/>
            <xs:pattern value="\w+"/>
```

```
    </xs:restriction>
  </xs:simpleType>
  <xs:complexType name="CertificateDetails">
    <xs:annotation>
      <xs:documentation>Used to identify a certificate or set of certificates.
SubjectName is compared against the DN provided as the certificate's Subject field, or
against any Name provided in the SubjectAlternativeName extentions of type
DirectoryName. IssuerName is compared against the DN provided as the certificate's
Issuer field, or against any Name provided in the IssuerAlternativeName extentions of
type DirectoryName. </xs:documentation>
    </xs:annotation>
    <xs:sequence>
      <xs:element name="SubjectName" type="xs:string"/>
      <xs:element name="IssuerName" type="xs:string"/>
    </xs:sequence>
  </xs:complexType>
  <!-- Alias definitions -->
  <xs:element name="AliasList">
    <xs:complexType>
      <xs:sequence>
        <xs:element maxOccurs="unbounded" ref="AliasDefinition"/>
      </xs:sequence>
    </xs:complexType>
  </xs:element>
  <xs:complexType name="AliasDefinitionBaseType">
    <xs:attribute name="Name" type="xs:string"/>
  </xs:complexType>
  <xs:element name="AliasDefinition" type="AliasDefinitionBaseType"
abstract="true"/>
  <!-- Locations -->
  <xs:simpleType name="ProviderNameType">
    <xs:restriction base="xs:normalizedString">
      <xs:minLength value="1"/>
      <xs:maxLength value="20"/>
      <xs:whiteSpace value="collapse"/>
    </xs:restriction>
  </xs:simpleType>
  <xs:simpleType name="ProviderIdType">
    <xs:restriction base="xs:token">
      <xs:pattern value="\d{1,6}"/>
    </xs:restriction>
  </xs:simpleType>
  <xs:complexType name="ProviderType">
    <xs:sequence>
      <xs:element name="ProviderID" type="ProviderIdType"/>
      <xs:element name="ProviderName" type="ProviderNameType"/>
    </xs:sequence>
  </xs:complexType>
  <xs:complexType name="LocationType">
    <xs:choice maxOccurs="unbounded">
      <xs:element name="Provider" type="ProviderType"/>
      <xs:element name="LocationAlias" type="xs:string"/>
    </xs:choice>
    <xs:attribute name="negate" type="xs:boolean" default="false"/>
  </xs:complexType>
  <xs:element name="LocationAliasDefinition"
type="LocationAliasDefinitionType" substitutionGroup="AliasDefinition"/>
  <xs:complexType name="LocationAliasDefinitionType">
    <xs:complexContent>
      <xs:extension base="AliasDefinitionBaseType">
        <xs:sequence>
          <xs:element name="Location" type="LocationType"/>
        </xs:sequence>
      </xs:extension>
    </xs:complexContent>
  </xs:complexType>
  <!-- Times -->
  <xs:complexType name="TimeType">
    <xs:choice maxOccurs="unbounded">
      <xs:element name="TimePeriod" type="TimePeriod"/>
      <xs:element name="RecurringTimePeriod"
type="RecurringTimePeriod"/>
      <xs:element name="TimeAlias" type="xs:string"/>
    </xs:choice>
    <xs:attribute name="negate" type="xs:boolean" default="false"/>
  </xs:complexType>
  <xs:element name="TimeAliasDefinition" type="TimeAliasDefinitionType"
substitutionGroup="AliasDefinition"/>
  <xs:complexType name="TimeAliasDefinitionType">
```

```xml
      <xs:complexContent>
        <xs:extension base="AliasDefinitionBaseType">
          <xs:sequence>
            <xs:element name="Time" type="TimeType" maxOccurs="unbounded"/>
          </xs:sequence>
        </xs:extension>
      </xs:complexContent>
    </xs:complexType>
    <xs:simpleType name="TimeOfWeek">
      <xs:annotation>
        <xs:documentation>Defines a time as an offset from the midnight preceding 12:00:01 AM Sunday (P0D) to the midnight following 11:59:59 PM Saturday (P7D). </xs:documentation>
      </xs:annotation>
      <xs:restriction base="xs:duration">
        <xs:minInclusive value="P0D"/>
        <xs:maxInclusive value="P7D"/>
      </xs:restriction>
    </xs:simpleType>
    <xs:complexType name="RecurringTimePeriod">
      <xs:annotation>
        <xs:documentation>Defines a period of time within the week as a start/end TimeOfWeek. If EndTime is less than StartTime, the period is interpreted as crossing Saturday night. </xs:documentation>
      </xs:annotation>
      <xs:attribute name="StartTime" type="TimeOfWeek" use="required"/>
      <xs:attribute name="EndTime" type="TimeOfWeek" use="required"/>
    </xs:complexType>
    <xs:complexType name="TimePeriod">
      <xs:annotation>
        <xs:documentation>Defines a period of time as a start/end date and time. </xs:documentation>
      </xs:annotation>
      <xs:attribute name="StartTime" type="xs:dateTime" use="required"/>
      <xs:attribute name="EndTime" type="xs:dateTime" use="required"/>
    </xs:complexType>
</xs:schema>
<?xml version="1.0" encoding="UTF-8"?>
<xs:schema xmlns:base="Base/v1" elementFormDefault="qualified" targetNamespace=" CarrierControl/Plans/v1">
    <xs:import schemaLocation="Alias.xsd" namespace="CarrierControl/Base/v1"/>
    <!-- Plan Definition -->
    <xs:complexType name="BillingCycleType">
      <xs:attribute name="StartDate" use="required" type="xs:dateTime"/>
      <xs:attribute name="Duration" use="required">
        <xs:simpleType>
          <xs:restriction base="xs:duration">
            <xs:minExclusive value="PT0S"/>
          </xs:restriction>
        </xs:simpleType>
      </xs:attribute>
      <xs:attribute name="Resets" type="xs:boolean" default="true"/>
    </xs:complexType>
    <xs:simpleType name="CostStyleType">
      <xs:annotation>
        <xs:documentation>CostType expresses the incremental cost of a plan: - Unrestricted: There is no incremental cost for consumption on this plan - Fixed: Consumption goes against a quota which the user has purchased / agreed to purchase - Variable: The user will be billed for incremental usage on this plan </xs:documentation>
      </xs:annotation>
      <xs:restriction base="xs:string">
        <xs:enumeration value="Unrestricted"/>
        <xs:enumeration value="Fixed"/>
        <xs:enumeration value="Variable"/>
      </xs:restriction>
    </xs:simpleType>
    <xs:element name="Plan">
      <xs:complexType>
        <xs:sequence>
          <xs:element minOccurs="0" ref="Description"/>
          <xs:element minOccurs="0" ref="Usage"/>
        </xs:sequence>
        <xs:attribute name="Name" use="required" type="xs:string"/>
      </xs:complexType>
    </xs:element>
```

```
      <xs:element name="Description" type="DescriptionBaseType" abstract="true"/>
      <xs:complexType name="DescriptionBaseType">
         <xs:sequence>
            <xs:element name="BillingCycle" type="BillingCycleType" minOccurs="0"/>
            <xs:element name="Conditions" minOccurs="0">
               <xs:complexType>
                  <xs:all>
                     <xs:element name="Location" type="base:LocationType" minOccurs="0"/>
                     <xs:element name="Time" type="base:TimeType" minOccurs="0"/>
                     <xs:element name="Direction" default="inout" minOccurs="0">
                        <xs:simpleType>
                           <xs:restriction base="xs:token">
                              <xs:enumeration value="in"/>
                              <xs:enumeration value="out"/>
                              <xs:enumeration value="inout"/>
                           </xs:restriction>
                        </xs:simpleType>
                     </xs:element>
                     <xs:element name="Destination" minOccurs="0">
                        <xs:complexType>
                           <xs:annotation>
                              <xs:documentation> PhoneNumber only applies to SMS/Voice plans; HostName only applies to data plans </xs:documentation>
                           </xs:annotation>
                           <xs:sequence>
                              <xs:element name="PhoneNumber" minOccurs="0">
                                 <xs:simpleType>
                                    <xs:restriction base="xs:string">
                                       <xs:pattern value="(\+)?\d+"/>
                                    </xs:restriction>
                                 </xs:simpleType>
                              </xs:element>
                              <xs:element name="HostName" minOccurs="0">
                                 <xs:simpleType>
                                    <xs:restriction base="xs:anyURI"/>
                                 </xs:simpleType>
                              </xs:element>
                           </xs:sequence>
                        </xs:complexType>
                     </xs:element>
                     <xs:element name="LimitedUsage" minOccurs="0">
                        <xs:annotation>
                           <xs:documentation> For Fixed plans, provides details on the user's quota: - Limit: The amount of the quota (in minutes for Voice plans, megabytes for Data plans, and messages for SMS plans) - SharedPlan: Another plan name whose quota is also consumed by usage on this plan - FallbackPlan: Another plan name whose consumption begins when this quota is exhausted. If a Fallback Plan is not provided, the current plan goes into an Overage state. </xs:documentation>
                        </xs:annotation>
                        <xs:complexType>
                           <xs:attribute name="Limit" use="required" type="xs:nonNegativeInteger"/>
                           <xs:attribute name="SharedPlan" type="xs:string"/>
                           <xs:attribute name="FallbackPlan" type="xs:string"/>
                        </xs:complexType>
                     </xs:element>
                  </xs:all>
               </xs:complexType>
            </xs:element>
         </xs:sequence>
         <xs:attribute name="CostStyle" use="required" type="CostStyleType"/>
      </xs:complexType>
      <xs:complexType name="DataPlanDescriptionType">
         <xs:complexContent>
            <xs:extension base="DescriptionBaseType">
               <xs:sequence>
                  <xs:element name="BandwidthInKbps" type="xs:nonNegativeInteger" minOccurs="0"/>
                  <xs:element name="MaxDownloadFileSizeInMegabytes" type="xs:positiveInteger" default="25" minOccurs="0"/>
                  <xs:element name="SecurityUpdatesExempt" type="xs:boolean" default="false" minOccurs="0"/>
               </xs:sequence>
            </xs:extension>
```

```
      </xs:complexContent>
    </xs:complexType>
    <xs:element name="DataPlanDescription" type="DataPlanDescriptionType"
substitutionGroup="Description"/>
    <xs:complexType name="SmsPlanDescriptionType">
      <xs:complexContent>
        <xs:extension base="DescriptionBaseType"/>
      </xs:complexContent>
    </xs:complexType>
    <xs:element name="SmsPlanDescription" type="SmsPlanDescriptionType"
substitutionGroup="Description"/>
    <xs:complexType name="VoicePlanDescriptionType">
      <xs:complexContent>
        <xs:extension base="DescriptionBaseType"/>
      </xs:complexContent>
    </xs:complexType>
    <xs:element name="VoicePlanDescription" type="VoicePlanDescriptionType"
substitutionGroup="Description"/>
    <xs:element name="Usage" type="PlanUsageType"/>
    <xs:complexType name="PlanUsageType">
      <xs:attribute name="PlanName" use="required" type="xs:string"/>
      <xs:attribute name="OverLimit" type="xs:boolean"/>
      <xs:attribute name="Congested" type="xs:boolean"/>
      <xs:attribute name="CurrentUsage" use="required"
type="xs:nonNegativeInteger"/>
      <xs:attribute name="UsageTimestamp" use="required" type="xs:dateTime"/>
    </xs:complexType>
</xs:schema>
```

What is claimed is:

1. A system comprising:
a memory area associated with a mobile computing device;
a mobile computing device comprising a processor programmed to:
dynamically generate data usage statistics representing network data consumed under a user data usage plan, the data usage statistics being dynamically generated, at the mobile computing device, by identifying an amount of the network data sent and received by the mobile computing device, and
transmit a portion of the generated data usage statistics to a second computing device.

2. The system of claim 1, wherein the user data usage plan comprises one or more of the following: peak times, off-peak times, peak time data consumption quota, off-peak time data consumption quota, peak time data consumption remaining, off-peak time data consumption remaining, a roaming rate, a mobile operator name, a billing cycle type, and a network connection type.

3. The system of claim 1, wherein the portion of the generated data usage statistics is transmitted to one or more other computing devices.

4. The system of claim 3, wherein the mobile computing device and the one or more other computing devices share the user data usage plan.

5. The system of claim 3, wherein the user data usage plan describes threshold values associated with one or more network connections of the mobile computing device or the one or more other computing devices, wherein the threshold values correspond to maximum data consumption allotted under the user data usage plan for one or more network connections.

6. The system of claim 1, wherein the identified amount of the network data sent and received by the mobile computing device comprises one or more of the following: time and date of network data consumption, location of the network data consumption, network interface used, subscriber identity module (SIM) card or other user identity module used for dual SIM, an international mobile station equipment identity (IMEI), internet protocol (IP) or other address of an access point, and an application responsible for the network data consumption.

7. The system of claim 1, wherein the user data usage plan is associated with a plurality of network connections, and wherein the plurality of network connections are categorized based on types of network traffic data.

8. A method comprising:
dynamically generating data usage statistics representing network data consumed under a user data usage plan by a mobile computing device, the data usage statistics being dynamically generated, at the mobile computing device, by collecting the network data consumed by the mobile computing device, the user data usage plan describing threshold values associated with one or more network connections of the mobile computing device; and
sending, by the mobile computing device, the generated data usage to a second computing device.

9. The method of claim 8, wherein the second computing device is associated with a user interface that is displayed differently for different types of user data usage plans.

10. The method of claim 9, wherein the user interface displays a plurality of user interface elements which are updated with an update in the generated data usage statistics.

11. The method of claim 8, wherein the generated data usage statistics include an amount of remaining network data for consumption and a quantity of time remaining for consumption of the remaining network data.

12. The method of claim 8, wherein dynamically generating the data usage statistics comprises receiving network data consumed by one or more computing devices.

13. The method of claim 9, wherein the user interface displays a user interface element which allows the user to select options or other configuration settings for receiving notifications.

14. The method of claim 8, further comprising:
receiving information representing network data consumed by a second mobile computing device; and presenting the dynamically generated data usage statistics and the information representing network data consumed by the second mobile computing device in a user interface on the mobile computing device.

15. One or more computer storage devices embodying computer-executable components, said components comprising:
- a collection component that when executed causes at least one processor on a mobile computing device to dynamically generate data usage statistics representing network data consumed under a user data usage plan by the mobile computing device, the data usage statistics being dynamically generated by determining an amount of network data sent and received by the mobile computing device;
- a data structure component that when executed causes at least one processor on the mobile computing device to populate a schema with the dynamically generated data usage statistics; and
- a communications interface component that when executed causes at least one processor on the mobile computing device to distribute at least a portion of the schema to one or more other computing devices.

16. The computer storage devices of claim 15, further comprising a data structure component that when executed causes at least one processor to populate the schema with the dynamically generated data usage statistics.

17. The computer storage devices of claim 15, further comprising a user interface component that when executed causes at least one processor to display the dynamically generated data usage statistics.

18. The computer storage devices of claim 17, wherein the user interface component displays data usage statistics associated with one or more other computing devices, which share the user data usage plan, in separate user interface elements.

19. The computer storage devices of claim 17, wherein the user interface component displays the data usage statistics associated with the one or more other computing devices in a user interface element on a home screen of the mobile computing device.

20. The computer storage devices of claim 17, wherein the user interface component displays one or more of the following: one or more user data usage plans associated with the mobile computing device, threshold values associated with a plurality of network connections of the mobile computing device, and how much data consumption is remaining and over which of the plurality of the network connections.

* * * * *